United States Patent [19]
Lutz

[11] Patent Number: 6,116,585
[45] Date of Patent: Sep. 12, 2000

[54] PRESSURE HOLDER WITH AN ENCLOSED GAS MASS

[75] Inventor: Dieter Lutz, Schweinfurt, Germany

[73] Assignee: Mannesmann Sachs AG, Schweinfurt, Germany

[21] Appl. No.: 09/132,355

[22] Filed: Aug. 11, 1998

[30] Foreign Application Priority Data

Aug. 11, 1997 [DE] Germany .............................. 197 34 677
Aug. 5, 1998 [DE] Germany .............................. 198 35 322

[51] Int. Cl.[7] .................................. F16F 9/18; F16F 9/08; F16J 12/00; F15B 1/10; F16L 55/04
[52] U.S. Cl. ........................ 267/64.27; 138/30; 267/64.23
[58] Field of Search ............................. 267/64.27, 64.11, 267/64.28, 64.23, 64.25; 138/30, 26, 31; 60/413, 415, 416; 188/298, 314, 315, 269; 220/501, 590, 500, 720, 530, 721; 303/DIG. 11, 87; 92/103 M; 417/540; 428/304.4, 220; 521/134

[56] References Cited

U.S. PATENT DOCUMENTS

| | | |
|---|---|---|
| 3,027,600 | 4/1962 | Stormer et al. . |
| 3,750,855 | 8/1973 | Peddinghaus ........................... 188/269 |
| 3,901,359 | 8/1975 | Jentsch .................................... 188/269 |
| 3,938,840 | 2/1976 | Haase et al. ............................ 188/298 |
| 4,449,552 | 5/1984 | Porel ........................................ 138/30 |
| 4,742,898 | 5/1988 | Lee ........................................... 188/315 |
| 4,763,883 | 8/1988 | Crabtree ................................. 267/64.27 |
| 4,880,213 | 11/1989 | Shinbori et al. . |
| 5,036,110 | 7/1991 | Moureaux . |
| 5,054,373 | 10/1991 | Brault et al. . |
| 5,117,873 | 6/1992 | Miyakawa et al. ....................... 138/30 |
| 5,215,124 | 6/1993 | Hattori et al. ............................ 138/30 |
| 5,246,761 | 9/1993 | Sasaki . |
| 5,323,953 | 6/1994 | Adderley et al. . |
| 5,499,739 | 3/1996 | Greist, III et al. ....................... 138/30 |
| 5,505,228 | 4/1996 | Summerfield ............................ 138/30 |
| 5,543,194 | 8/1996 | Rudy . |
| 5,618,629 | 4/1997 | Takamatsu et al. ...................... 138/30 |
| 5,645,922 | 7/1997 | Le Rossignol ........................... 138/30 |
| 6,016,841 | 1/2000 | Larsen .................................. 267/64.27 |

FOREIGN PATENT DOCUMENTS

| | | | |
|---|---|---|---|
| 1273917 | 9/1961 | France ................................. 267/64.27 |
| 1153829 | 6/1989 | Japan .................................. 267/64.27 |
| 615860 | 1/1949 | United Kingdom ................ 267/64.27 |
| 835107 | 5/1960 | United Kingdom ................ 267/64.27 |

*Primary Examiner*—Douglas C. Butler
*Attorney, Agent, or Firm*—Cohen, Pontani, Lieberman & Pavane

[57] ABSTRACT

A pressure holder, filled with a medium and having a gas mass that pressurizes the holder, especially for volume compensation in a vibration damper. The gas mass including a deformable enveloping body with a wall in which a pressurized gas is enclosed. The wall of the enveloping body is multi-layered, with at least one layer being a metal foil.

16 Claims, 5 Drawing Sheets

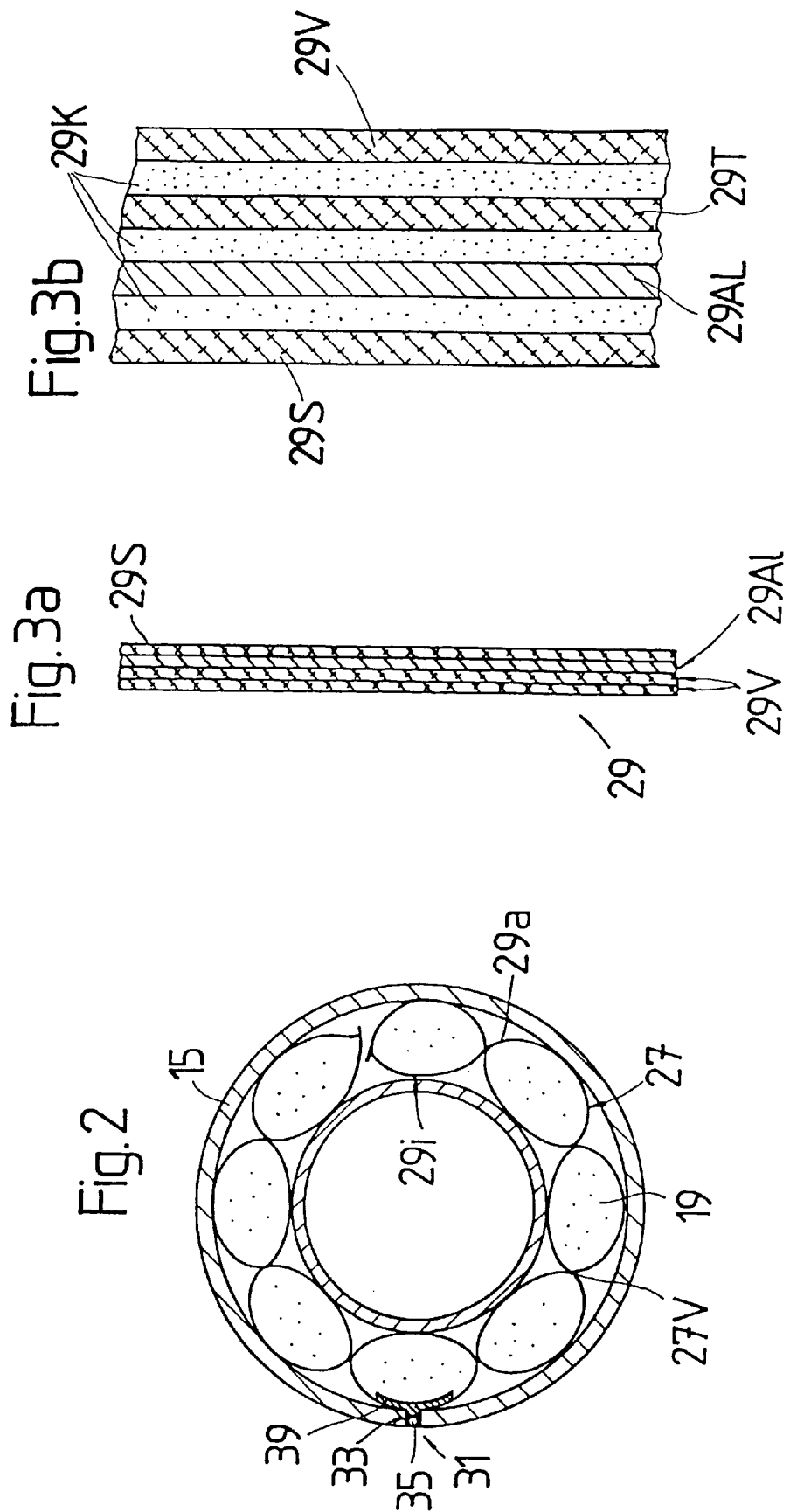

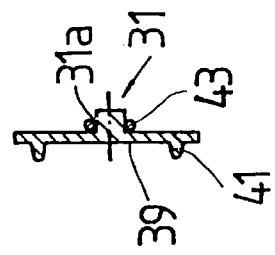
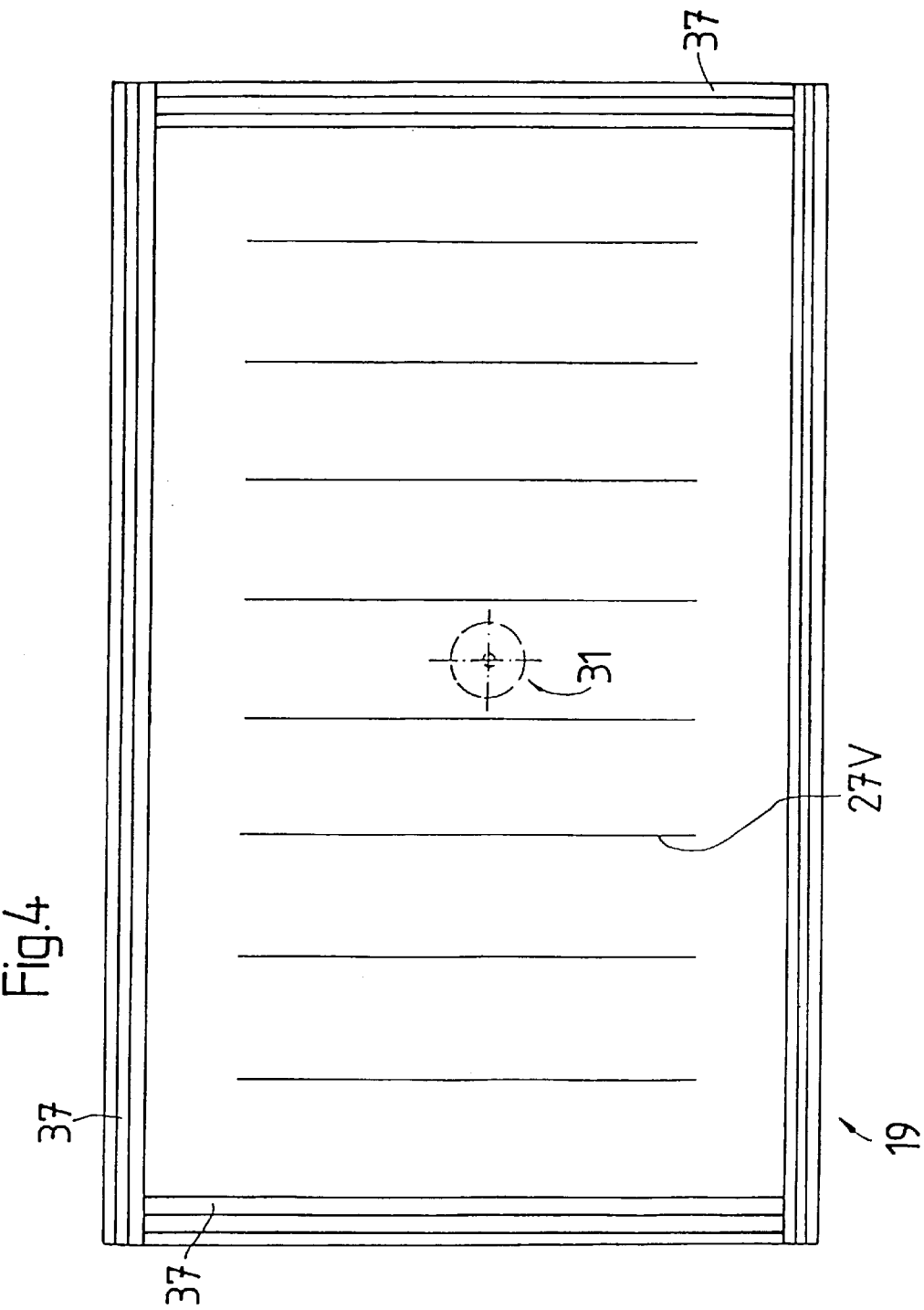

PRESSURE HOLDER WITH AN ENCLOSED GAS MASS

BACKGROUND OF THE INVENTION

1. Field of the Invention

The invention relates to a pressure damper with an enclosed gas mass for volume compensation in a vibration damper.

2. Discussion of the Prior Art

Enclosed gas masses are used, for example, when a medium is to be placed and held under pressure, but no mixing with an open pressure fluid is permitted. One widespread use is in piston-cylinder aggregates such as vibration dampers. A vibration damper with an enclosed gas mass is known, for example, from U.S. Pat. No. 3,294,391. The enclosed gas mass serves to compensate for the volume of the piston rod or the piston that submerges into the vibration damper.

A problem with such enclosed gas masses is that gas diffuses through the wall of the enveloping body into the damping medium of the vibration damper. If a certain level of gas emerges in this fashion, the vibration damper becomes limited in function, for example, or even unusable. One method of reducing this problem is to use certain feed gases, such as nitrogen. However, even nitrogen diffuses through the conventional enveloping bodies, which frequently consist of a rubber material or an elastomer, particularly at high temperatures.

SUMMARY OF THE INVENTION

The object of the present invention is to provide an enclosed gas mass that can be universally used, has a gas mass determined as precisely as possible, can be filled up and has a lower tendency to emit gas.

Pursuant to this object and others which will become apparent hereafter, one aspect of the present invention resides in the wall of the enveloping body comprising a multiple layer construction including a gas-impermeable blocking layer. Previous walls of rubber or other elastomers cannot be described as blocking layers; at the most, they could be called separating layers. The multiple layer wall of the enveloping body increases the blocking effect in that the blocking effect of the individual layers is overlapped and reciprocally supported. If the enveloping body is configured as a planar cushion or pillow the enveloping body can be preformed to be inserted into curved spaces. During operation, the wall according to the invention is deformable and substantially strain-free. High straining is related to permeability in the sense that highly strainable materials have greater distances and lower forces between their individual molecules.

In one embodiment of the invention, a metal foil is used as the material for the wall. A metal foil must be considered virtually impermeable to diffusion and more temperature-resistant than previous rubber materials. It has proved especially advantageous for aluminum to be used as the material for the metal foil. Aluminum can be rolled to extreme thinness without defects at acceptable cost.

To allow the enclosed gas mass to be sealed simply and reliably, the metal foil is covered inside with a layer of weldable material. The material used could be PE, PP or PA, for example.

Moreover, it has proved especially advantageous for the metal foil to be covered on the outside with a protective layer. The protective layer significantly enhances the mechanical properties of the foil, especially its crease formation and tearing strength. For example, PET or PA could be used for the protective layer.

To attain the greatest possible strength and form stability, the inner material layer of the wall comprises multiple individual layers, which are arranged crosswise relative to each other. Intrinsic tensions in the foil (which can also be oriented one or two dimensionally) are thus compensated for, so that, at a low pressure differential, no unwanted distortion of the enclosed gas mass occurs.

The enveloping body should be as flexible as possible. In order to accomplish this a thin metal foil is used. To compensate for the reduced strength of the metal foil, a carrier layer is provided, which is coordinated with the metal foil. The carrier layer is arranged between the metal foil and the innermost work material position. The innermost work material position is necessary for welding, for example. In this way the carrier layer can act as a protection layer for the metal foil. In order to jointly utilize a plurality of layers to form the enveloping body, adhesive layers are arranged between the individual functioning layers.

To seal the enclosed gas mass at acceptable expense, the wall is welded at the edges. In this regard, it has proved advantageous for the enveloping body to be composed of multiple individual parts. The parts of the enveloping body can be designed so that no welded seams are needed in the area of a fold of the enveloping body, where such seams would result in considerable material stress.

In one embodiment of the invention the enveloping body is constructed as a hose body that is closed at the ends. The hose can be easily extruded in a layered manner and vapor deposited with a metal layer. Depending upon the application or chamber shape of the pressure holder, the hose body can be closed by a cover and/or a bottom.

In further advantageous embodiment, the enveloping body has connections running in a sectional fashion between at least two opposite walls. This results in greater form stability and better flexibility of the enclosed gas mass, so that, depending on its use, the assembly of the enclosed gas mass can be facilitated and the stresses in the wall can be reduced. Thus, the connections running in sectional fashion in the enveloping body are oriented, given an at least curved insertion layer, parallel to the central axis of the insertion layer.

To allow the enveloping body to be filled with gas, there is a feed connection. Advantageously, during the filling process, the feed connection seals a feed opening in the pressurized container. This self-sealing effect simplifies the filling process, especially facilitating measures against leakage of the container. The feed connection comprises a flange that lies inside the enveloping body. The flange permits the use of a feed unit, e.g., an injection needle, during the filling process. Further, the flange is equipped with spacing pieces relative to the opposite wall, so that contact between this wall and the feed connection is avoided. Should such contact occur, adhesive effects that would place an unnecessary mechanical load on the entire component could not be ruled out.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The drawings show:

FIG. 2 is a section through the vibration damper and the enclosed gas mass along line II—II in FIG. 1;

FIGS. 3a and 3b are sectional views of the wall of the enveloping body;

FIG. 4 is a view of the enclosed gas mass;

FIG. 7 is a sectional view of the feed connection of the enclosed gas mass as an individual part.

DETAILED DESCRIPTION OF THE PREFERRED EMBODIMENTS

Figure 1:
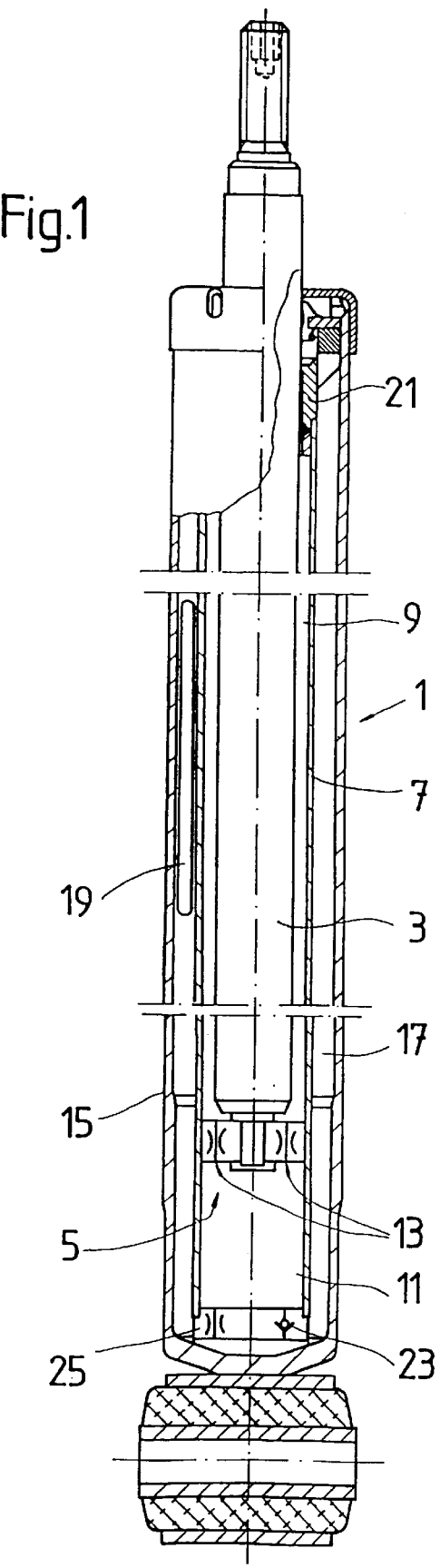
FIG. 1 is a sectional view of a vibration damper the inventive enclosed gas mass.

FIG. 1 shows a known dual-pipe vibration damper 1 having a piston rod 3 with a piston 5 that is axially movable in a pressure tube 7. The piston 5 separates the pressure tube 7 into an upper work space 9 and a lower work space 11. The two work spaces 9, 11 are connected via damping valves 13 in the piston 5.

The pressure tube 7 is encased by a container tube 15. The inner wall of the container tube 15 and the outer wall of the pressure tube 7 thereby form a compensation space 17, which is filled completely, up to a piston rod guide 21, by damping medium and an enclosed gas mass 19. At the lower end of the work space 11, there is a bottom that has, as applicable, a non-return valve 23 and a damping valve 25.

When the piston rod 3 moves, the volume of the displaced piston rod 3 is compensated for by a change in the volume of the enclosed gas mass 19.

FIG. 2 shows a section through the vibration damper 1 in the area of the enclosed gas mass 19. The enclosed gas mass 19 consists of a enveloping body 27 with a wall 29 that is pressure-filled with a gas, especially nitrogen. The enclosed gas mass 19 has an inner wall 29i and an outer wall 29a, which in turn form a beginning and an end. In the illustrated example, the enclosed gas mass 19 is placed into the compensation space 17 in the manner of a circular arc. The sectional drawing shows chambers of the enclosed gas mass arranged in series. The chambers are formed by connections 27V running parallel to the axis of the vibration damper 1 between the inner wall 29i and the outer wall 29a. The connections 27V are embodied only in a sectional fashion, so that all chambers can exchange gas with one another and the same operating pressure prevails in each chamber. When the operating pressure in the work spaces 9, 11 rises, the chambers of the enclosed gas mass 19 are compressed. The wall 29 does not become elastically deformed, because the internal pressure and the external pressure are equal. Only the distances between the connections 27V on the divided circle of the connections enlarge, as a result of which the internal wall 29i and the external wall 29a are pressed toward each other.

The enclosed gas mass 19 has a feed connection 31, which is accessible via a feed opening 33 in the container tube 15. During assembly of the vibration damper 1, the unfilled enveloping body 27 is placed into the container tube 15, and the feed connection 31 is buttoned into the feed opening 33. After this, the pressure tube 7 is inserted. The entire vibration damper 1 is then filled with oil. The volume of the oil filling is based on the later operating pressure, which is determined, while the piston rod 3 is standing still, by means of the enclosed gas mass 19. When the vibration damper 1 is closed, the enclosed gas mass 19 can be filled via a feed unit (not shown), e.g., an injection needle. When the injection needle is removed, the prick opening closes automatically. The feed opening 33 can be sealed after filling by means of the pressed-in ball 35.

FIG. 3a shows a section through the wall 29, wherein the inner wall 29i and the outer wall 29a consist of the same material and have the same structure. The core of the wall is a metal foil, particularly an aluminum foil 29A1 only a few $\lambda$m thick. In particular, rolled aluminum is especially suitable. The aluminum foil performs the sealing function for the enclosed gas. Toward the outside, the aluminum foil is covered by a protective film 29S. This protective film 29S promotes stability, increases tearing strength and prevents excessive crease formation. This layer has a strength in the range of the aluminum foil and consists, for example, of PET or polyamid.

Toward the inside, the wall has a weldable covering 29V. The weldable covering 29V can also be embodied in multiple layers, e.g., as a dual layer, and can have roughly four to five times the material strength of the aluminum foil 29A1. In a multi-layered covering 29V, the individual layers are oriented and are applied crosswise relative to each other. As a result, high strength and form stability are achieved and, in particular, internal stresses are compensated for. Useful materials for these layers are PP and PA. The thickness of the layers is between 50 and 100 $\mu$m. If one uses PA for the protective layer and the welding layer one can utilize seal welding for the enveloping body. By seal welding the protective layer overlaps the welding layer and is welded thereto by the application of heat.

FIG. 3b shows a construction of the wall of the enveloping which has a carrier layer 29T. The carrier layer 29T serves to strengthen the enveloping body 29 in all loading directions. By using the carrier layer 29T, the metal foil 29A1 can be reduced to an absolute minimum. In this way the enveloping body becomes more flexible and has rubber elastic characteristics. The carrier layer 29T also protects the metal foil during the welding process. It must be insured that no working medium escapes from the pressure holder so as to come in contact with the metal foil. This is because the working medium can chemically attack the metal foil. The metal foil 29A1 is arranged in a neutral portion wall of the enveloping body in order to optimize bending.

An adhesive layer 29K can be arranged between the previously discussed layers. This layer can for example be made of PU and serves to securely connect together the adjacent layers. The adhesive layer can be provided as a conventional adhesive or has an adhesive foil. As an alternative, the individual layers can also be calendered.

FIG. 4 shows an unwound gas cushion 19. At the edge are welded seams 37, which create a closed body from the inner wall 29i and the outer wall 29a. For the welded seam 37, the weldable covering 29V (see FIG. 3a) is needed. FIG. 4 also shows why an inner wall and an outer wall are used.

Figure 5:
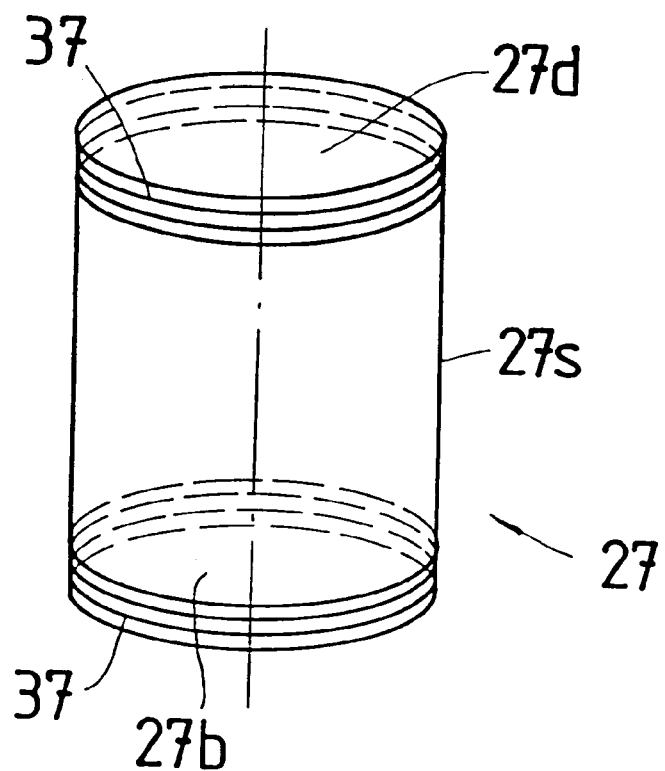
FIG. 5 shows an embodiment of the enveloping body.

FIG. 5 shows an enveloping body 27 which is made of a cylindrical hose part 27S which has a enveloping body bottom 27B and an enveloping body top or cover 27D. These three individual pieces are connected together by two weld seams 37. In this embodiment the metal foil is sprayed seamlessly onto the carrier layer during the production process. Layer thicknesses from only 2 $\mu$m are possible.

Figure 6:
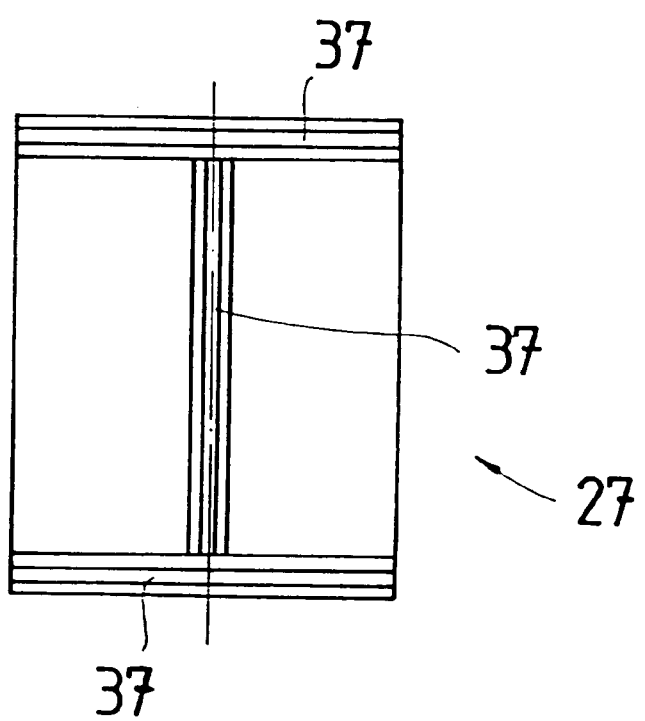
FIG. 6 shows a further embodiment of the enveloping body.

FIG. 6 shows a pouch or sac-shaped enveloping body 27 with three weld seams 37. If the enveloping body during use is deformed so as to have a ring-shape, the desired position of the enveloping body is such that the axially running weld seam lies on the largest radius of the ring shape in order to achieve favorable folding on the innermost smaller radius.

The aforementioned connections 27V can also be seen in FIG. 4. The connections are embodied only in a sectional fashion, so that adjacent chambers can undertake a volume exchange. Connections in the form of seams are not absolutely necessary. Individual connection points are also conceivable.

FIG. 7 shows the feed connection 31 in detail. The feed connection 31 basically comprises a flange 39, which rests inside on the outer wall 29a. Spacing pieces 41 are embodied on the flange 39 in the direction of the inner wall 29i. The spacing pieces 41 are meant to prevent the inner wall 29i from adhering to the flange 39 and thus interfering with the filling process. The feed channel 31a can be embodied openly, in closeable fashion or as a valve. In order to achieve better sealing the flange 39 can be provided with an O-ring 43. Due to the operating pressure in the pressure holder the enveloping body is always prestressed in the filling opening of the pressure holder so that the sealing of the O-ring is ensured.

Figure 8:
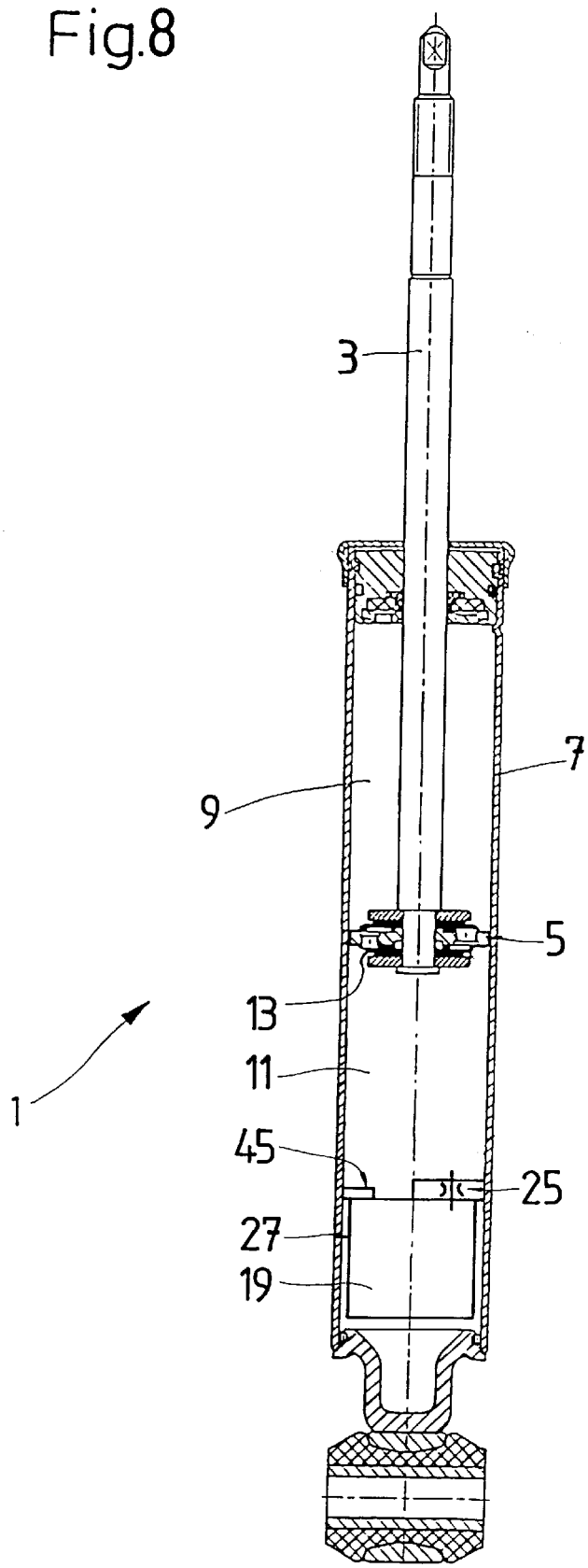
FIG. 8 is a sectional view of a single tube vibration damper with an enclosed gas mass.

The described use in vibration dampers is intended only as an example. The spring forces of the enclosed gas mass could also be used, of course. For example, use as a gas spring, partial or full, is conceivable, as used, for example, in travelling mechanism technology for level control and hydraulic spring elements. In other applications, for example the single tube damper shown in FIG. 8, a stop 45 is provided which hinders the lifting of the enveloping body. The single tube vibration damper is composed of essentially the same components as the vibration damper having two tubes as shown in FIG. 1. As a stop it is possible to use a ring or a bottom valve 25.

The invention is not limited by the embodiments described above which are presented as examples only but can be modified in various ways within the scope of protection defined by the appended patent claims.

I claim:

1. A pressure holder, comprising:

a deformable enveloping body having a multi-layered wall formed of a metal foil and configured so as to be deformable and substantially strain-free;

a pressurized gas enclosed in the body, the wall of the enveloping body being formed at least partially of a gas-impermeable blocking layer, the wall including a weldable material layer arranged on an inner side of the metal foil and a protective layer arranged on an outer side of the metal foil; and an adhesive layer arranged between at least two layers of the enveloping body wall.

2. A pressure holder as defined in claim 1, wherein the wall is formed of aluminum.

3. A pressure holder as defined in claim 1, wherein the inner material layer of the wall consists of multiple individual layers which are arranged crosswise relative to each other.

4. A pressure holder as defined in claim 1, wherein the wall includes a carrier layer arranged on the metal foil.

5. A pressure holder as defined in claim 4, wherein the wall includes an innermost work-material layer, the carrier layer being arranged between the metal foil and the innermost work material layer.

6. A pressure holder as defined in claim 1, wherein the wall has edges that are welded.

7. A pressure holder as defined in claims 1, wherein the enveloping body includes a plurality of individual parts.

8. A pressure holder as defined in claim 1, wherein the enveloping body is configured as a hose body having closed ends.

9. A pressure holder as defined in claim 8, wherein the hose body is closed by at least one of a bottom and a top.

10. A pressure holder as defined in claim 1, wherein the enveloping body has at least two opposing walls and connections that run in a sectional manner between the at least two opposing walls.

11. A pressure holder as defined in claim 10, wherein the enveloping body defines an insertion position having a central axis, the connections being oriented parallel to the central axis.

12. A pressure holder as defined in claim 1, and further comprising a gas feed connection in the enveloping body.

13. A pressure holder as defined in claim 12, wherein the feed connection is operative to seal a feed opening in the body during filling with gas.

14. A pressure holder as defined in claim 12, wherein the feed connection includes a flange that lies internally against the enveloping body.

15. A pressure holder as defined in claim 14, wherein the enveloping body has a further wall opposite the wall so as to form an enclosure, the flange having spacing pieces directed toward the further opposite wall.

16. A pressure holder as defined in claim 1, wherein at least one of the layers is a metal foil.

* * * * *